Sept. 13, 1949.   E. E. GREGORY   2,481,586
CARRYING DEVICE FOR FISHHOOKS
Filed Feb. 14, 1948

INVENTOR
Eli E. Gregory
BY
HIS ATTORNEYS

Patented Sept. 13, 1949

2,481,586

UNITED STATES PATENT OFFICE 2,481,586

CARRYING DEVICE FOR FISHHOOKS

Eli E. Gregory, Lewisport, Ky.

Application February 14, 1948, Serial No. 8,343

6 Claims. (Cl. 43—32)

This invention relates to devices for supporting and carrying fish hooks, flies, leaders and the like, and its objective is the provision of an improved carrying device which is especially convenient to use.

Various devices, such as tackle boxes, fly books and the like, have heretofore been proposed, and while these are useful in affording a means for the fisherman to carry a considerable supply and variety of fishing lures, flies, etc., they are not generally considered satisfactory for carrying the flies, hooks, etc., which are immediately in use as when one is wading a stream. Consequently these latter are often carried on the hat, being secured thereto by catching the hooks themselves in the hat band, crown or brim, according to choice and the number of hooks carried.

Carrying the hooks, etc., on the hat in this manner, however, is not entirely satisfactory for a number of reasons. For one thing, it is sometimes annoying to dislodge the barb of the hook from the felt or fabric of the hat; if the barbs are not firmly embedded in the hat there is the possibility of loss. Also, the carrying of leaders on the hat is not satisfactory because there is no convenient way of tying the loop end of the leader in place.

The primary object of my present invention is to provide a support or carrying device which is constructed to securely hold fish hooks, including snelled hooks, flies, spinners, spoons, plugs, leaders, and the like, securely in place and readily attachable and detachable from the hat band.

Another object of the invention is to provide such device in the form of a hat band which can either be built into the hat, or be made separately and quickly attached to any hat or cap.

Another object of the invention is to provide a support for snelled hooks, flies, leaders, and the like, which is so constructed that they will be kept in good condition and kinkless so that they will be ready for instant use.

The invention will be described in connection with the accompanying drawings, which show the invention embodied in a hat band which may be applied to an existing fishing hat or cap. In these drawings.

Figure 1:
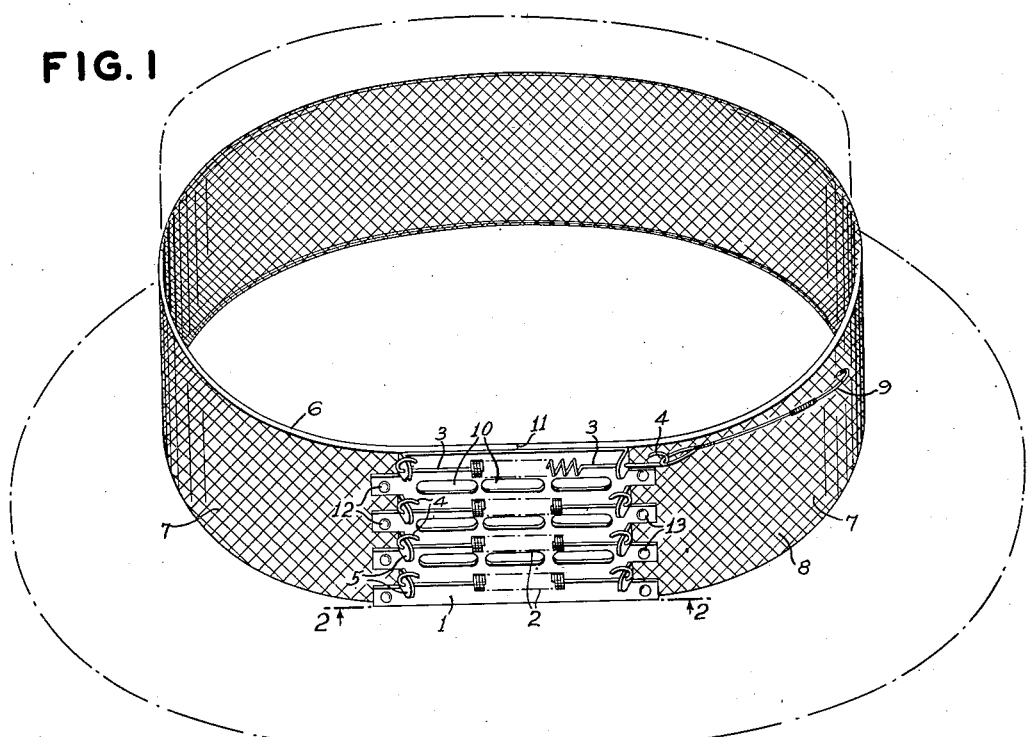
Fig. 1 is a perspective view of the hat band of the present invention and showing the hat in dot and dash outline.

Briefly describing the device of the present invention, it comprises a resiliently mounted supporting hook on which the eye of the fish hook or loop of a snelled hook may be engaged, and a supporting member for the fish hook itself which is composed of two layers of material, the outer specifically being penetrable by the hook and the inner resisting penetration of the hook. These two layers of material are arranged in the form of a hat band with the resilient eye engaging device mounted thereon. Accordingly, with this arrangement, the eye of the fish hook or snelled hook, etc., is placed on the supporting hook and then the parts are placed under tension and the fish hook is engaged with a convenient part of the hat band. When it is desired, the fish hook may be readily removed from the hat band by first freeing the hook itself and then removing the eye from its supporting hook.

Referring now to the drawings, the improved fish hook carrying device of the present invention comprises a base plate or mounting member 1, of metal, plastic, or other suitable material, Monel or stainless steel being preferred, which serves as a mounting for one or more fish hook supporting means for sliding movement lengthwise of the base plate 1. Each of the fish hook supporting means includes a pair of shank portions 3, about one-half inch in length, which have their inner or adjacent ends resiliently connected by helical springs 2, also made of corrosion resisting metal such as Monel, bronze, stainless steel, or the like. The remote or outer end of each shank portion 3 terminates in a hook-shaped portion 4. The shank portions 3 are mounted to slide in small apertures formed respectively in two ears 5 which are bent outwardly from the base or body portion of the mounting 1. These ears are aligned lengthwise of the base plate 1 and are spaced apart approximately 1½–2 inches or slightly more, so that the length of springs 2 when in contracted position shown in Fig. 2 is about ½–1 inch or slightly more. These springs are made of light gauge but highly resilient wire and preferably several of them are arranged in parallel position on mounting 1 as shown in Fig. 1.

Mounting 1 for these tension springs is associated with a hook attaching band 6 which is made of any flexible material which is suitable to receive the points of the hooks without damaging them and from which they may be readily freed with the fingers. As shown in Fig. 1, hook attaching band 6 is made of fine gauge corrosion resisting metal wire, preferably Monel metal wire, fabricated to form a layer of open mesh 7, and a strip of flexible smooth hard backing material 8 into which the points of the hooks will not readily enter. A convenient method of manufacture is to weave the metal wire in the form of a tube on the backing layer strip 8 (see Fig. 2). Certain smooth-surfaced flexible plastics, and certain closely woven and hardly twisted fabrics are suitable for strip 8. Band 6 is of approximately the same width as mounting 1, namely the desired width or height of the hat band.

Figure 2:
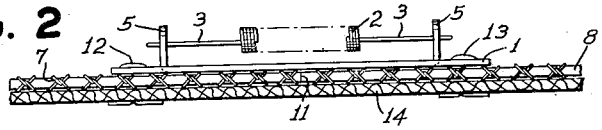
Fig. 2 is a sectional view taken on line 2—2 of Fig. 1 looking in the direction of the arrows.

In the operation of placing a fishing lure on the hat band, the loop end of the lure, for example, the loop of the snelled hook 9 shown in Fig. 1, is first slipped under one of the resiliently mounted hooks 4. Then the lure is pulled to the right so as to tension the spring 2 (see for example the uppermost of these springs shown in Fig. 1). The hook portion of snelled hook 9 is then engaged in one of the wire meshes to which it is adjacent. This places the gut of the snelled hook under tension and it is held under tension until removed for use. Thus it is held in straight condition thereby preventing the formation of kinks, or entanglement with twigs or other objects.

If desired, another snelled hook, fly, spinner, etc., may be attached to the opposite hook 4 of the same spring, in which case the tension of the spring is taken by the hook 9 instead of by ear 5. In case a leader is to be mounted on the hat band, the procedure is the same as just described except that the leader may be wound several times around the hat in order to take up its length. Then the hook on the end of the leader is engaged with one of the meshes 7. Should the leader be of such length that its hook comes opposite the metal mounting 1, the hook may be engaged in one of the several apertures 10 which are provided in the base of the mounting for this purpose. The ears 5 are spaced vertically from one another in order to permit the leader to lie in the channels between them, thereby allowing the leader to follow closely the surface of the hat band.

The composite band 6 is made initially of a length to fit the largest size hat and may be cut off to fit by the user. The joint between the two ends of this band is placed beneath the metal mounting 1 and may be made as a butt joint as shown at 11. The entire hat band is secured in place on the hat by any convenient means, such as stitching, or the two series of split pins 12 and 13. These may be inserted through holes in lugs which project from each end of the mounting and then through holes made in strip 8 and in the material of the crown 14 of the hat. The legs of these pins 12 and 13 are then spread and flattened as shown in Fig. 2. If desired, one end of mounting 1 may be permanently attached to the band 6 at the factory. It will be understood that other fastening devices such as rivets may be used if desired in either one or both instances.

Figure 3:
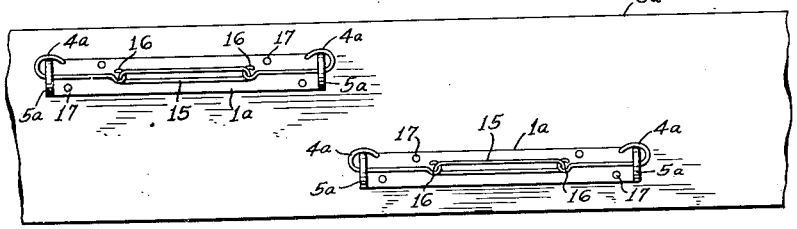
Fig. 3 is a view of a modified form of attaching device for the loop ends of the snelled hooks, flies, etc.

Referring now to the modifications shown in Fig. 3, the fish hook supporting means comprises pairs of slidable members, the remote ends of which are formed into hooks 4a, and the adjacent ends of which are formed into eyes 16 which are resiliently connected by means of an elastic band 15 of rubber or other extensible and resilient material, the opposite ends of which are received in the eyes 16. The shank portions of these slidable members are arranged to slide in apertures in two spaced ears 5a. These ears are upturned from a mounting 1a and as shown only one pair of loop supporting hooks 4a is provided in each mounting, instead of several as in the mounting 1 of Fig. 1. These mountings 1a may be distributed in staggered relation around the periphery of the band 6a, using as few or as many as desired. They may be held in position in any suitable way as by means of stitching (not shown) applied through the holes 17. When the slidable members are pulled away from one another the eyes 16 engage the ears 5a and form stop means which limit the sliding movement of the members.

Although the invention has been described in particular in connection with a hat band it will be understood that the backing strip 8 or 8a may be constructed of rigid instead of flexible materials, should it be desired to employ the device for supporting hooks, etc., in tackle boxes or the like.

The present invention may be used for supporting or carrying, not only the hooks previously mentioned, which may be made with or without snells, but also for supporting spinners, small spoons, plugs, and wire or braided or gut leaders, and the device of the invention has the advantage of supporting these fishing lures in good condition, kinkless and in an orderly and handy manner so that the fisherman may readily use them. Also the device may be built into new hats, or as described sold as an attachment to be put on the fisherman's favorite fishing hat or cap.

Although the invention has been illustrated and described in connection with two modifications, it will be understood that changes other than those mentioned may be made without departing from the spirit of the invention, its scope being set forth in the appended claims.

I claim:

1. A fish hook carrying device comprising a hat band of open mesh material having secured thereto at spaced locations slidably-mounted fish hook supporting means, said fish hook supporting means including at least two members, each having a loop at its adjacent end and a hook at its remote end, and resilient means connecting the loops together, each hook being adapted to receive the eye of a fishing implement including a fish hook so that the fish hook may engage the mesh and cause expansion of the resilient means and sliding movement of the supporting means relative to the band.

2. A fish hook carrying device as set forth in claim 1 in which said loops are in the form of eyes which provide shoulders which constitute stop means for limiting sliding movement of the respective supporting means.

3. A fish hook carrying device as set forth in claim 1 in which there are a plurality of said slidably-mounted supporting means spaced apart transversely of the band.

4. A fish hook carrying device as set forth in claim 1 in which said slidably-mounted supporting means are mounted on a single base plate.

5. A fish hook carrying device as set forth in claim 1 in which said slidably-mounted supporting means are mounted on a single base plate having outwardly-extending apertured ears through which said members extend for sliding movement.

6. A fish hook carrying device comprising a hat band of open mesh material having secured thereto base plate means having pairs of spaced, outwardly-extending apertured ears aligned lengthwise of the band, the respective pairs of ears being spaced transversely of the band, fish hook supporting means mounted for sliding movement, lengthwise of the band, in the apertures of the respective pairs of aligned ears, said fish hook supporting means including at least two shank portions, each having a hook at its remote end and resilient means connecting together the adjacent ends of said shank portions, hooks at the remote ends of the shank portions each being adapted to receive the eye of a fishing implement including a fish hook so that the fish hook may engage the mesh material and cause expansion of the resilient means and sliding movement relative to the band of the shank portion carrying the hook.

ELI E. GREGORY.

REFERENCES CITED

The following references are of record in the file of this patent:

UNITED STATES PATENTS

| Number | Name | Date |
| --- | --- | --- |
| 1,339,231 | Stewart | May 4, 1920 |
| 1,787,568 | Cooke | Jan. 6, 1931 |
| 2,041,232 | Collins | May 19, 1936 |